(12) United States Patent
Barthel et al.

(10) Patent No.: US 7,453,902 B2
(45) Date of Patent: Nov. 18, 2008

(54) FAILSAFE TRANSMISSION OF DATA

(75) Inventors: Herbert Barthel, Herzogenaurach (DE); Frank Schiller, Nümberg (DE); Edgar Sigwart, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 731 days.

(21) Appl. No.: 11/126,098

(22) Filed: May 10, 2005

(65) Prior Publication Data

US 2005/0249112 A1      Nov. 10, 2005

(30) Foreign Application Priority Data

May 10, 2004      (EP)      .................................. 04011105

(51) Int. Cl.
*H04L 12/413* (2006.01)
(52) U.S. Cl. ........................ 370/447; 370/352; 370/353; 370/354; 370/355; 370/356; 455/41.2; 455/463
(58) Field of Classification Search ........................ None
See application file for complete search history.

(56) References Cited

U.S. PATENT DOCUMENTS 5,450,398 A * 9/1995 Abefelt et al. .............. 370/352

7,079,857 B2 * 7/2006 Maggenti et al. ............ 370/447
2002/0129042 A1 * 9/2002 Bradshaw et al. ........... 707/200

FOREIGN PATENT DOCUMENTS

| DE | 102 19 501 A1 | 11/2003 |
|---|---|---|
| EP | 1 043 640 A2 | 10/2000 |
| WO | WO 00/38021 | 6/2000 |

* cited by examiner

*Primary Examiner*—Raj K Jain

(57) ABSTRACT

The invention relates to a system and a method for the failsafe transmission of data, the system having at least one component (2, 6, 7), which is enhanced for the failsafe transmission of data. To allow the failsafe transmission of data with reduced hardware outlay, it is proposed according to the invention that the one-channel component (2, 6, 7) is enhanced for the fail-safe transmission of data in that it is connected via a bus (1) to a failsafe computer unit (8), it has a communication driver (23), which maintains the data in standard and non-standard form, the communication driver (23) maintains a marker value, which indicates whether safe replacement values or real values are used, in standard and non-standard form.

16 Claims, 2 Drawing Sheets

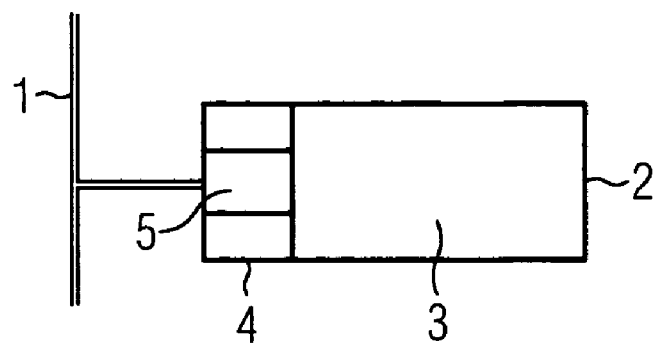
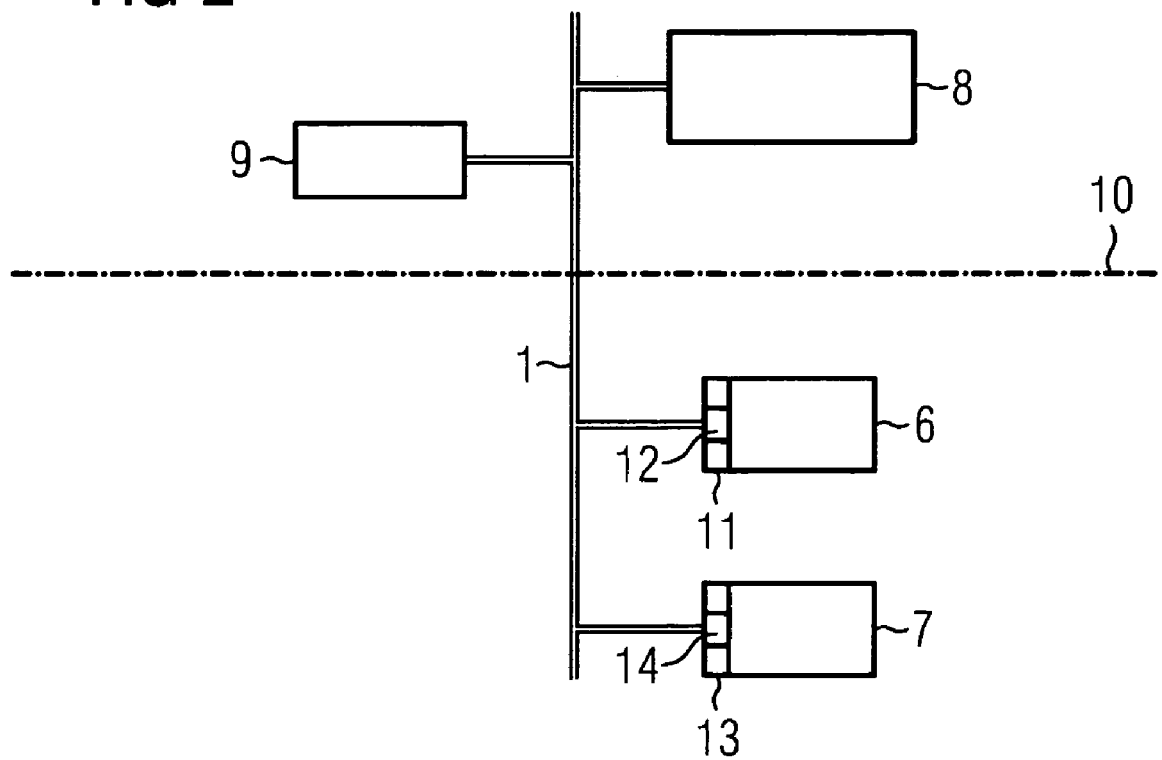

FAILSAFE TRANSMISSION OF DATA

CROSS REFERENCE TO RELATED APPLICATIONS

This application claims priority to the European application No. 04011105.6, filed May 10, 2004 and which is incorporated by reference herein in its entirety.

FIELD OF INVENTION

The invention relates to a system and a method for the failsafe transmission of data, the system having at least one component, which is enhanced for the failsafe transmission of data.

BACKGROUND OF THE INVENTION

Peripheral devices with two microcontrollers are used for the failsafe transmission of data via failsafe bus nodes. Such safe peripheral devices generally achieve safety integration level SIL 2 to SIL 3 according to IEC 61508. In the process industry however operationally proven devices without a bus connection are frequently used for safety applications.

The term failsafe according to DIN V VDE 0801 and VDI/VDE 3542 describes the ability of a system to remain in a safe state or to return immediately to a safe state in the event of failure.

SUMMARY OF THE INVENTION

The object of the invention is to allow the failsafe transmission of data with reduced hardware outlay.

This object is achieved by a system for the failsafe transmission of data with at least one one-channel component, which is enhanced for the failsafe transmission of data in that it is connected via a bus to a failsafe computer unit, it has a communication driver, which maintains the data in standard and non-standard form ("non-standard form" corresponds to "diversitaerer Form" in the original European priority application in German language), the communication driver maintains a marker value, which indicates whether safe replacement values or real values are used, in standard and non-standard form, a checksum is generated in the communication driver from the data maintained in nonstandard form and a program run control is provided to monitor execution of the program.

This object is achieved by a method for the failsafe transmission of data, in which data is transmitted in a failsafe manner with at least one one-channel component, the components being connected via a bus to a failsafe computer unit, a communication driver of the component maintaining the data in standard and non-standard form ("non-standard form" corresponds to "diversitaerer Form" in the original European priority application in German language), the communication driver maintaining a marker value, which indicates whether safe replacement values or real values are used, in standard and non-standard form, a checksum being generated in the communication driver from the data maintained in non-standard form and execution of the program being monitored by a program run control.

According to the invention it is possible, based on a one-channel component, in particular a microcontroller, to use a communication driver, which achieves safety integrity level SIL 2 (according to IEC 61508). Expensive, totally redundant configuration of the hardware or software of the component is not necessary. At the points where the two microcontrollers would be synchronized in the case of a redundant configuration, according to the invention a program run control is activated, to verify whether these synchronization points are processed in the correct sequence. The data and the marker value are also maintained in duplicate, i.e. in parallel in standard and non-standard form—in particular in non-inverted and inverted form. Further errors are identified by the failsafe computer unit.

In the process industry in particular for cost reasons components are not configured in a redundant manner, as this is expensive. To achieve the safety integrity level required in the process industry, according to an advantageous embodiment of the invention it is proposed that the real values are process values, the component is a peripheral device for processing the process values and the bus is a fieldbus. According to a further advantageous embodiment of the invention the component is a sensor or an actuator in particular.

In order to achieve the required safety class, according to a further advantageous embodiment of the invention the computer unit is certified to a safety standard.

The most immediate use possible of the component is facilitated, if according to a further advantageous embodiment of the invention the component is an operationally proven component extended to include the failsafe communication driver. To ensure that the operational reliability required in some instances is maintained, according to a further advantageous embodiment of the invention the component is provided with a disabled failsafe data supplement and an active failsafe one-channel communication driver for at least intermittent use in applications with no relevance to safety, it being possible to release the failsafe data supplement.

BRIEF DESCRIPTION OF THE DRAWINGS

The invention is described and explained below with reference to the exemplary embodiments shown in the figures, in which:

FIG. 1 shows a one-channel component enhanced for the failsafe transmission of data, FIG. 2 shows a system for the failsafe transmission of data.

DETAILED DESCRIPTION OF THE INVENTION

Figure 3:
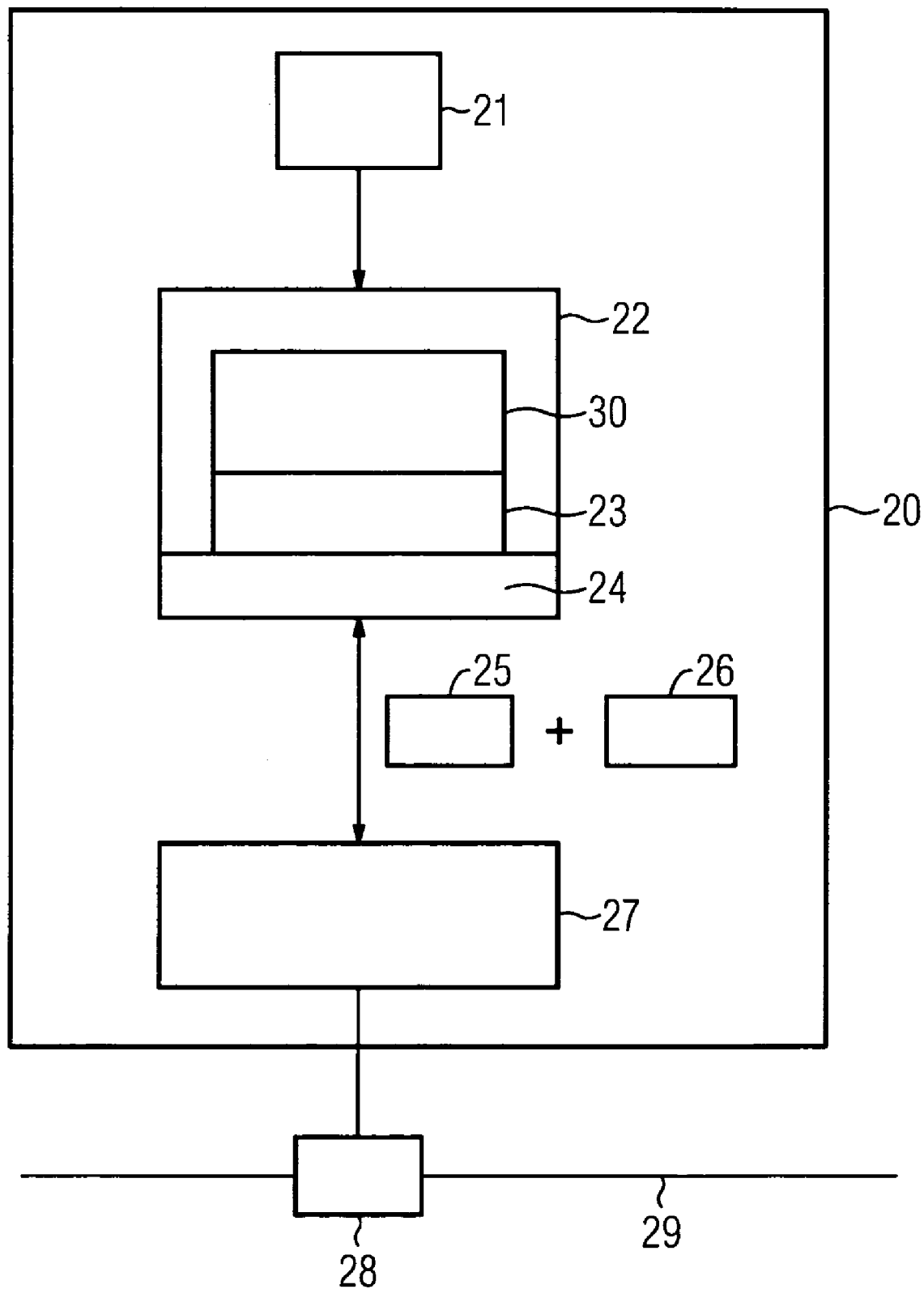
FIG. 3 shows a further component for the failsafe transmission of data.

The invention is described with reference to a PROFI safe profile. PROFIsafe is a profile for the fieldbus standard PROFIBUS DP, which satisfies the requirements of IEC 61508. Both failsafe and standard communication are thereby possible via a single cable. PROFIsafe extends PROFIBUS to a safety bus, which satisfies the stringent requirements of process and manufacturing technology.

The proposed system and method allow failsafe communication to safety integrity level SIL 2 (according to IEC 61508 Part 3) to be achieved. The following are also achieved:

Use of operationally proven sensors/actuators with PROFIsafe

Use of a measuring transducer (MU), which is itself not certified to IEC 61508 but for which there is a manufacturer's "proven in use" declaration according to IEC 61511/NE79

The so-called F-communication element (the failsafe communication element in PROFIsafe; F=failsafe) can be certified to SIL 2 (IEC 61508 Part 3), see also NE97 (i.e. "adequate reduction of systematic error on the sensor/actuator")

The control of communication errors on the communication path corresponds to SIL 2 according to IEC 61508 Parts 1 and 3

A PROFIsafe driver can be achieved, which can be parameterized for two-channel measuring transducers and can also be used for "proven in use" measuring transducers, i.e. one-channel devices.

In order for the system to achieve the required safety integrity level, the sensor/actuator systems of the field devices and the bus connection of the field device signal must be operationally proven as with conventionally structured protection devices for process control technology or must satisfy at least the requirements of SIL 2 for adequate reduction of systematic errors, without having to be specifically certified. The above-mentioned NE97 specifies that for safe data transmission protocol stacks according to IEC 61508 are used in the sensors and actuators, which apply reliably generated signals to the bus. There are no safety requirements for the transmission medium itself (e.g. bus lines, bus masters, bus couplers). The protocol that ensures safety (safety layers in addition to transmission layers, e.g. PROFIsafe) can be activated as required by means of a switch in the field device. The field devices can therefore be used both for devices that are of relevance to safety and those that are not. If a device is safety-relevant, it must be ensured, for example by means of a locking function, that the safety-relevant settings cannot be changed. The measures specified ensure that failsafe communication is possible to the programmable logic controller (PLC). In failsafe operation the bus system must ensure that the following errors are identified within the error tolerance period and a failsafe response according to the specifications is initiated:

Address mutilation
Repetition
Loss
Insertion
Incorrect sequence
Information mutilation
Delay.

According to the invention operationally proven components can be used, which are equipped with a single microcontroller, and a safety integrity level to SIL 2 according to IEC 61508—as generally required in the process industry—can still be achieved. This in particular avoids having to use protection devices that only have certified components, which generally requires additional spare parts stocks. According to process industry requirements therefore the same components can be used for safety technology and for the remaining automation technology. This also means that a firmware/hardware modification also results in new operational reliability according to IEC 61511/IEC 61508, so that safety integrity level SIL 2 is maintained.

FIG. 1 shows the function units of a one-channel component 2 enhanced for the failsafe transmission of data, in this instance a bus-compatible fieldbus device. The component 2 is connected via a bus connection 4, which has a protocol stack 5, to the bus 1, in this instance a fieldbus. The sensor system or process connection of the component 2 is marked with the reference character 3.

FIG. 2 shows a system for the failsafe transmission of data, which has two one-channel components 6, 7, which are enhanced for the failsafe transmission of data. The components 6, 7, according to the exemplary embodiment in FIG. 2 an actuator and a sensor, are connected via the bus 1, in this instance a fieldbus, to the failsafe computer unit 8, e.g. a failsafe programmable logic controller. The components 6, 7 each have a bus connection 11, 13 with a protocol stack 12, 14. A bus master 9 is also connected to the bus 1. The boundary between the switch space (bus master 9 and failsafe computer unit 8) and the field (components 1, 2) is symbolized by the reference character 10.

One exemplary embodiment of a safe communication driver is a PROFIsafe driver. Certification of the protocol stack of the PROFIsafe driver to IEC 61508 Part 3 ensures that adequate reduction of systematic errors according to the requirements of safety integrity level SIL 2 is achieved. If there are no systematic errors in the protocol stack itself, the protocol stack thereby detects errors in the data transmission according to the requirements of SIL 2 (IEC 61508 Part 3). Sporadic errors are thereby reduced adequately by the one-channel PROFIsafe driver. As with a two-channel PROFIsafe driver, adequate detection of random hardware errors is required with a one-channel PROFIsafe driver and this is achieved by the measures described below.

According to one exemplary embodiment of the invention operationally proven devices are extended to include the PROFIsafe driver and are connected via a fieldbus to a certified failsafe controller. The PROFIsafe driver has functions which ensure that the following transmission errors are detected:

Telegram repetition
Telegram loss
Telegram insertion
Incorrect telegram sequence
Mutilation of useful data
Telegram delay
Coupling of safety-relevant and standard messages
Addressing errors (both duplicated and incorrect addressing errors).

The driver thus corresponds to SIL 2 according to IEC 61508. Existing operationally proven field devices are supplemented with this driver, which poses no problems if there is sufficient space. The field device thus supplemented, including bus communication, is therefore suitable for SIL 2 or NAMUR applications (see NAMUR NE97).

FIG. 3 shows a one-channel component, which is enhanced for the failsafe transmission of data to SIL 2 (IEC 61508). The component 20 is connected via a bus node 28 to a fieldbus 29, e.g. a standard PROFIBUS. The component 20 has a failsafe sensor 21, also referred to as an F-sensor (F=failsafe), which transmits data to a microprocessor 22 of the component 20. The sensor 21 is failsafe because it is operationally proven or has been developed correspondingly. The sensor 21 can be a direct element of the component 20 or can be arranged externally—connected to the component 20 via a suitable connection. Standard failsafe field devices to date have a failsafe sensor 21, which is coupled to technology firmware 30 on the microprocessor 22 and is certified in this combination to SIL 2. According to the prior art however a safe bus connection is not possible for such a combination. In the exemplary embodiment of the invention shown in FIG. 3 the microprocessor 22 also has a communication driver 23, in this instance a PROFIsafe driver. The communication driver 23 serves for the failsafe transmission of data 25, which is transmitted with a failsafe appendix 26, the so-called F-appendix. Transmission here takes place using a DP stack IF (DP=decentralized periphery; IF=interface) of the microprocessor to a DP stack, a protocol stack on a PROFIBUS-ASIC 27. The protocol stack could also be integrated in the microprocessor itself.

The errors to be controlled are detected by the following measures: telegram repetition is identified by the so-called F-host, e.g. the failsafe computer unit. The F-host can also be configured in the form of a safe programmable logic controller, inter alia in the form of a failsafe program that can be run on a computer, e.g. a PC. Telegram loss is similarly identified by the F-host. Telegram insertion by another sender is identified by the so-called F-address. The F-address is parameterized and verified during start-up. An incorrect telegram sequence (resequencing) is identified in the F-host by expectation of the current number. The mutilation of useful data is also identified by the F-host, as the F-host has expectation in respect of the checksum (e.g. CRC=Cyclic Redundancy Check). If one processor generates the CRC incorrectly, the result only corresponds to the false data with a sufficiently low level of probability. Telegram delay is identified by the F-host by time monitoring. The coupling of safety-relevant and standard messages us identified by the F-host based on address expectation. Addressing errors are identified by expectation of the current number and the acknowledgment check in the F-host. Most of the errors are therefore identified by the F-host. An F-host is always available for the safety element for the failsafe applications described. This F-host has the characteristic that it detects errors with the required quality. Sporadic hardware errors, which can occur in the processing of the PROFIsafe driver, also have to be controlled. These are data errors in the process data sent, as well as data errors in the status bit "FV" (=marker to indicate whether safe replacement values or process values are used) as well as errors in the execution of the program. In order also to detect these errors within the process error tolerance period (typically 1 second), the following characteristics are supplemented:

- The process data is also transferred in non-standard, e.g. inverted, form to the PROFIsafe driver and maintained there.
- The status bit "FV" is also maintained in standard and non-standard form, in particular standard and inverse form, in the PROFIsafe driver.
- The checksum (e.g. CRC) is generated from a specific independent data field in the PROFIsafe driver.
- A one-channel program run control is introduced, i.e. all synchronization points are converted to a program run control.

These measures suffice to generate a safe one-channel driver for sensors from a driver formerly used as a two-channel driver. The one-channel PROFIsafe driver is also certified to IEC 61508 Part 3. Verification in respect of systematic errors in the PROFIsafe device takes place firstly by consideration of implementation and secondly by a conformance test on the F-protocol by a certification body.

According to IEC 61511 operational reliability means that the use of a device is assessed in ten different applications for a period of one year (see also IEC 61511 Part 1, sub-clause 6.7.3.3.3). This is achieved by operating the device with an implemented (and active) PROFIsafe driver but with the PROFIsafe data supplement disabled for a year in ten different applications without relevance to safety. At the end of this year the device can also be used for safety applications. The PROFIsafe protocol is then required. To this end only the PROFIsafe data is released and the device should be considered to be operationally proven with PROFIsafe drivers. The PROFIsafe driver is therefore always activated, only the provision of data is switched. The PROFIsafe driver therefore always runs at the same time, so that the same time and data response is achieved for operationally proven sensors. If the PROFIsafe driver were only activated, as is otherwise normally the case, when the device is used for safety applications, it can lose its operationally proven status with activation of the PROFIsafe driver, as the device is then deemed to be modified. The alternative option of developing the device as a failsafe device from the start should be considered to be significantly more expensive and protracted than the solution proposed here.

To summarize, the invention relates to a system and a method-for the failsafe transmission of data, the system having at least one component 2, 6, 7, which is enhanced for the failsafe transmission of data. To allow the failsafe transmission of data with reduced hardware outlay, it is proposed according to the invention that the one-channel component 2, 6, 7 is enhanced for the failsafe transmission of data in that it is connected via a bus 1 to a failsafe computer unit 8, it has a communication driver 23, which maintains the data in standard and non-standard form, the communication driver 23 maintains a marker value, which indicates whether safe replacement values or real values are used, in standard and non-standard form, a checksum is generated in the communication driver 23 from the data maintained in non-standard form and a program run control is provided to monitor execution of the program.

The invention claimed is:

1. A system for the failsafe transmission of data, comprising: at least one one-channel component, the component comprising: an interface for connecting the component via a bus to a failsafe computer unit; a communication driver maintaining the data in standard and non-standard form, wherein the communication driver maintains a marker value indicating whether safe replacement values or real values are used, wherein the marker value is in standard and non-standard form, and wherein a checksum is generated in the communication driver from the data maintained in non-standard form; and a program run control for monitoring a program flow; and
   wherein the one-channel component is provided with a disabled failsafe data supplement and an active failsafe one-channel communication driver for at least intermittent use in applications that are without relevance to safety for the failsafe data supplement, and wherein the failsafe data supplement is released during intermittent disabled failsafe data supplement use in applications with relevance to safety.

2. The system according to claim 1, wherein the real values are process values, the component is a peripheral device for processing the process values, and the bus is a fieldbus.

3. The system according to claim 1, wherein the computer unit is certified to a safety standard.

4. The system according to claim 1, wherein the component is an operationally proven component extended to include the failsafe communication driver.

5. The system according to claim 1, wherein the component is a sensor or an actuator.

6. A method for failsafe transmission of data, wherein data is transmitted in a failsafe manner with at least one one-channel component, the method comprising: connecting the component via a bus to a failsafe computer unit; maintaining the data in standard and non-standard form by a communication driver of the component; maintaining a marker value by the communication driver in standard and non-standard form, wherein the marker value indicates whether safe replacement values or real values are used; generating a checksum in the communication driver from the data maintained in non-standard form; monitoring an execution of a program by a program run control; and
   wherein the one-channel component having a deactivated failsafe data supplement and an active failsafe one-channel communication driver is used at least intermittently in applications that are without relevance to safety for the failsafe data supplement, and the failsafe data supplement is released during intermittent deactivated failsafe data supplement use in applications with relevance to safety.

7. The method according to claim 6, wherein the method is used in process automation, wherein the real values are process values, wherein the component processes the process values as a peripheral device, and wherein the bus is a fieldbus.

8. The method according to claim 6, wherein the computer unit is certified to a safety standard.

9. The method according to claim 6, wherein the component is an operationally proven component comprising the communication driver.

10. The method according to claim 6, wherein the component is a sensor or actuator.

11. A one-channel component for the failsafe transmission of data, comprising: an interface for connecting the component via a bus to a failsafe computer unit; a communication driver maintaining the data in standard and non-standard form, wherein the communication driver maintains a marker value indicating whether safe replacement values or real values are used, wherein the marker value is in standard and non-standard form, and wherein a checksum is generated in the communication driver from the data maintained in non-standard form; a program run control for monitoring an execution of a program flow; and wherein the one-channel component is provided with a disabled failsafe data supplement and an active failsafe one-channel communication driver for at least intermittent use in applications that are without relevance to safety for the failsafe data supplement, and wherein the failsafe data supplement is released is released during intermittent disabled failsafe data supplement use in applications with relevance to safety.

12. The component according to claim 11, wherein the real values are process values, the component is a peripheral device for processing the process values, and the bus is a fieldbus.

13. The component according to claim 11, wherein the computer unit is certified to a safety standard.

14. The component according to claim 11, wherein the component is an operationally proven component integrating the failsafe communication driver.

15. The component according to claim 11, wherein the component is a sensor or an actuator.

16. The component according to claim 11, wherein the communication driver is a failsafe communication driver.

\* \* \* \* \*